(12) United States Patent
Denisart et al.

(10) Patent No.: US 6,941,855 B2
(45) Date of Patent: Sep. 13, 2005

(54) EXTRACTION DEVICE WITH BUILT-IN CAPSULE LOADING SYSTEM

(75) Inventors: Jean-Luc Denisart, York (CH);
Jean-Luc Colantonio, Vevey (CH);
Lucio Scorrano, Yverdon (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/676,001

(22) Filed: Oct. 2, 2003

(65) Prior Publication Data

US 2004/0129145 A1 Jul. 8, 2004
US 2005/0000366 A9 Jul. 8, 2004

Related U.S. Application Data

(63) Continuation of application No. PCT/EP02/03632, filed on Mar. 26, 2002.

(30) Foreign Application Priority Data

Apr. 3, 2001 (EP) .............................................. 01108382

(51) Int. Cl.⁷ ................................................ A47J 31/00
(52) U.S. Cl. ...................... 99/289 R; 99/295; 221/199; 221/113; 221/121
(58) Field of Search ............................. 99/289 R, 295, 99/302 R; 221/199, 309, 92, 113, 119, 120, 121

(56) References Cited

U.S. PATENT DOCUMENTS

| | | | | |
|---|---|---|---|---|
| 2,243,895 A | * | 6/1941 | Brown ......................... | 99/295 |
| 4,829,889 A | * | 5/1989 | Takeuchi et al. .......... | 99/302 R |
| 6,026,732 A | | 2/2000 | Kollep et al. ................. | 99/295 |
| 6,240,832 B1 | | 6/2001 | Schmed et al. ............... | 99/289 |

FOREIGN PATENT DOCUMENTS

| | | |
|---|---|---|
| EP | 1 002 490 A1 | 5/2000 |
| EP | 1 046366 | 10/2000 |

* cited by examiner

*Primary Examiner*—Reginald L. Alexander
(74) *Attorney, Agent, or Firm*—Bell, Boyd & Lloyd LLC

(57) ABSTRACT

The invention relates to a device for feeding capsules containing a substance to be extracted in an extraction system under pressure for the preparation of a drink. The device includes a supply of capsules arranged in several series, and a mechanism for individually unloading one capsule into a reception part of the extraction system. The extraction system injects water into the capsule to form the drink as a liquid extract of the substance. The reception part is arranged beneath the unloading mechanism in such a way as to allow the direct descent of the released capsule into the reception part and includes structure for opening the capsule for releasing the liquid extract therefrom.

16 Claims, 6 Drawing Sheets

EXTRACTION DEVICE WITH BUILT-IN CAPSULE LOADING SYSTEM

CROSS-REFERENCE TO RELATED APPLICATION

This application is a continuation of International application PCT/EP02/03632 filed Mar. 26, 2002, the entire content of which is expressly incorporated herein by reference thereto.

BACKGROUND

The present invention relates to the preparation of drinks using the principle of extracting a substance contained in a refill, known as a "capsule", by passing a flow of water through it under pressure. The invention relates more specifically to an extraction device comprising a capsule feeding and loading system.

It is known to prepare drinks such as coffee from capsules containing a predetermined serving of ground-roasted coffee. Capsules have the advantage of facilitating the operations of preparing the drink, ensuring relatively clean preparation without leaving visible coffee grounds, and controlling the amount and quality of the prepared product.

The principle of extracting from a capsule includes the steps of (i) enclosing the capsule in a pressure-resistant enclosure, (ii) piercing one of the faces of the capsule, generally by means of one or more spike(s) or blade(s) situated in a part comprising a water inlet or injection device, (iii) introducing a quantity of hot water into the capsule to create a pressurized environment therein to produce the liquid coffee extract, and finally (iv) releasing the liquid coffee extract through the opposite face of the capsule which, on contact with projecting parts, opens under the internal pressure created inside the capsule.

In most commercially available extraction devices, the capsules are loaded manually and individually into the extraction capsule holder, this usually being a part corresponding to the base out of which the liquid extract later flows. The capsule holder may come in a variety of forms, as in the form of a bayonet-engagement spoon of the type used in traditional espresso machines. There are also movable drawer-type capsule loading systems in which a simplified loading movement (horizontal linear or other) places the capsule in the extraction system. Such a system is disclosed in copending U.S. patent application No. US2003089245A1.

There is however a need to feed capsules from a capsule magazine that does not require direct handling with the capsule but, on the contrary, encourages a more automated arrangement of the capsules in the extraction system. There is also a need to provide magazines of capsules that are all identical or, on the contrary, different, while being very easy to load. Such systems have already been described in a number of publications. For example, U.S. Pat. No. 3,440, 951 relates to an automatic coffee machines comprising a water heating and serving mechanism, a mechanism for storing loading cartridges containing coffee powder operating in conjunction with a mechanism that receives and moves the cartridges to place them in front of a hot-water discharging nozzle and to remove the cartridges after infusion, all these mechanisms being controlled by synchronized drive elements. Such a device is however very complicated and takes up a lot of room because of having to move the capsule between its storage point and its infusion point.

U.S. Pat. No. 6,240,832 relates to a device for feeding portions of ground coffee into an extraction unit having a magazine capable of accommodating a plurality of portions of coffee and means of unloading individual portions into the feeder device. The capsule release system is relatively complicated and uses several pairs of pins operated by pairs of actuating elements which in turn are controlled by an electromagnet. Each series or tube of portions of coffee possesses its own releasing parts, making the system relatively complicated, inefficient and expensive. The system moreover demands great precision and perfect synchronization of the movements of the releasing parts, which must act at the same time to avoid portions of coffee becoming jammed in the system. The more repetitions there are and the more the components become worn, such a system can become unreliable and prone to failures of greater of lesser severity. Another drawback is that the extraction chamber receiving the portion must pivot on the side to align itself in the direction of the extraction support before rising to meet the said support in a linear movement. The repeated combination of complex movements along several axes tends to affect the precision of the system, encourages premature wear of the mechanical parts and thus reduces the reliability and service life of the device. Another drawback is that extraction occurs from the bottom upwards, with the extracted liquid passing out through the top of the extraction support, which means that a tube must be provided to carry it to where the cup is to be filled. Such a configuration poses problems of draining the liquid and also of general size.

Thus, improvements in these type devices are desired, and these are provided by the present invention.

SUMMARY OF THE INVENTION

The present invention now provides a feeding and loading device connected to a capsule extraction system that is simpler, smaller and more reliable in use and without problems of pouring and draining the extracted liquid as in the art.

These advantages are achieved with a device for feeding capsules containing a substance to be extracted in an extraction system under pressure for the preparation of a drink. This device comprises storage means that includes a plurality of capsules arranged in several series; means for individually unloading a capsule selected from one of the series of capsules into a drink-forming position; means for forming a drink from a liquid extract of the substance by the introduction of a liquid under pressure into the selected capsule; and a reception part arranged beneath the individual unloading means to receive the selected capsule by direct descent, the reception part including means for opening the capsule to release the drink.

Advantageously, each series of capsules contains like capsules that are capable of making of a beverage that is different from that made from the other series of capsules. Also, the storage means can include a plurality of capsule holding tubes each of which contains one series of capsules. The capsule holding tubes are preferably mounted vertically on a rotatable support so that selection of a series of capsules is made by rotation of the support to position a selected series of capsules above the reception part.

The unloading means comprises a stationery plate having a passage in alignment with the selected capsule holding tube and arranged to allow a capsule to descend into the reception part; and close-off means able to move with respect to the passage between a closed position in which the passage is closed off by the close-off means in such a way as to allow the capsule to face the passage but remain in the storage means and an open position in which the passage is opened to allow the capsule to descend into the reception part. The close-off means preferably comprises a movable plate having an aperture that conforms to the passage and that is movable from the closed position, where movement of the capsule through the passage is prevented by the movable plate, to the open position where the aperture of the moveable plate is aligned with the passage of the stationery plate so as to allow the capsule to move through the passage and into the reception part.

BRIEF DESCRIPTION OF THE DRAWINGS

These characteristics and their advantages besides other possible characteristics and advantages will be made more understandable in the light of the description which follows and the drawings which follow.

DETAILED DESCRIPTION OF THE PREFERRED EMBODIMENTS

Figure 1:
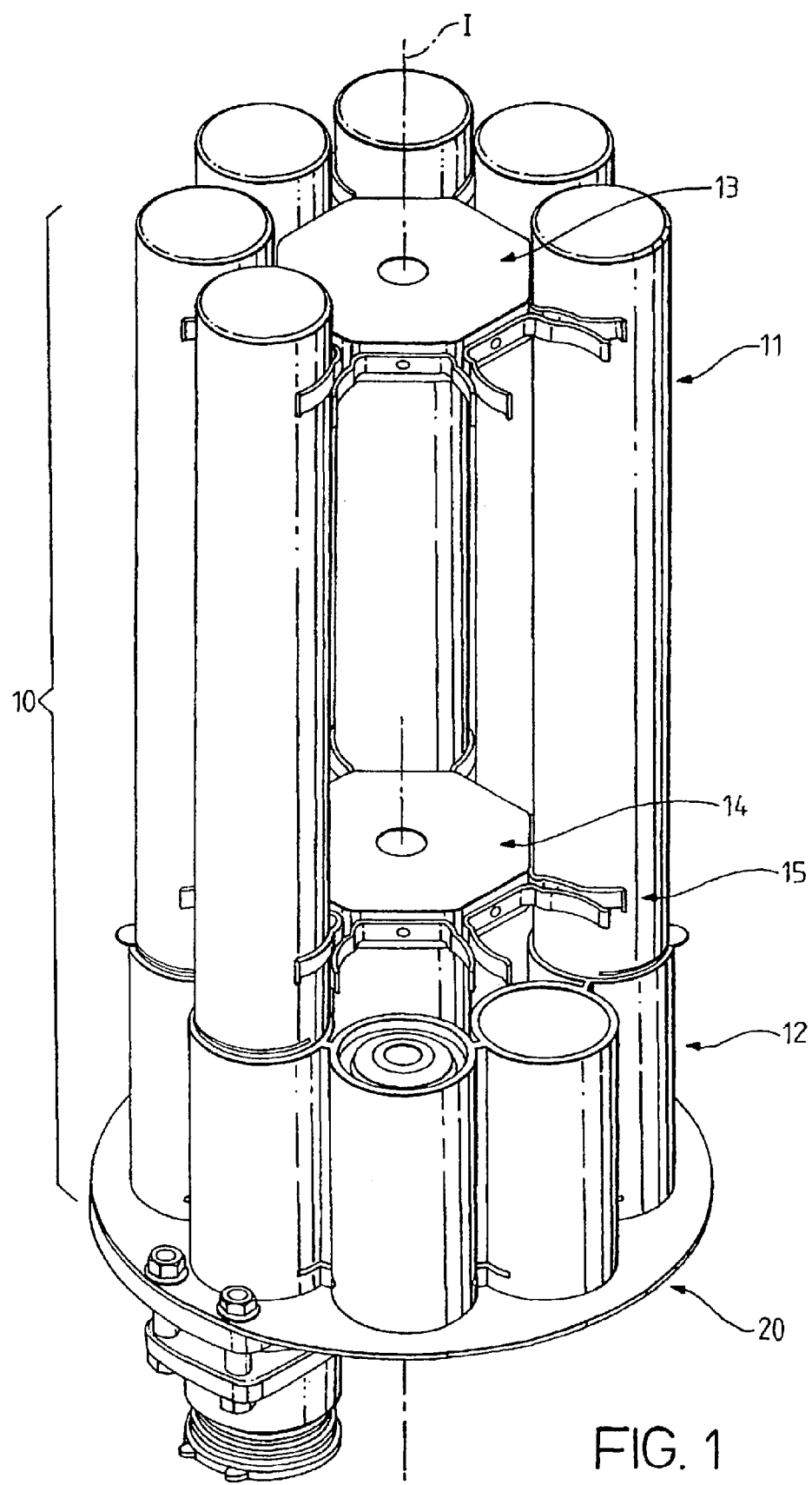
FIG. 1 is a perspective view of an extraction device with capsule loading system according to the invention.

In one embodiment, the device includes storage means comprising capsules arranged in several series, means for individually unloading one capsule into a reception part of the extraction system characterized in that the reception part of the extraction system is arranged underneath the unloading means in such a way as to allow the direct descent of the released capsule into the reception part and in that the reception part comprises means of opening the capsule capable of releasing the liquid extract and means of conveying this extract doe dispensing.

A configuration such as this therefore contributes to a faster, more direct feed and seeks to limit mechanical interactions that can give rise to early wear and reduce the service life of the device.

In an advantageous embodiment, the loading means comprises support means on which the storage means is rotatable comprising a passage arranged to allow a capsule to descend into the reception part of the extraction system in a configuration of alignment of a series with respect to the passage, and close-off means able to move with respect to the said passage between a position in which the passage is closed off by the close-off means in such a way as to hold the capsule facing the passage in the storage means and a position in which the passage is open to allow the capsule to descend into the reception part of the extraction system.

Thus, a configuration such as this has the advantage of using, for capsule loading, a reduced number of parts which are common to all series of capsules, namely the passage of a support means and close-off means with two positions in common as defined. Such a configuration can also allow rapid selection of the capsule in the series desired by the passage followed by release of the capsule by virtue of the means with two positions; this occurs reliably and rapidly.

In a preferred embodiment, the close-off means comprises a part complementary to the extraction system which when the means is located in the close-off position of the passage is located in alignment with the reception part of the extraction system. In other words, the closing off of the passage after loading of the capsule has the effect of bringing together the assembly parts of the extraction system into one and the same alignment. This also contributes to the reduction of the complexity of the system by limiting the number of parts and, as a consequence, of drive means (for example motors) necessary to perform the loading and positioning functions of the extraction system.

More particularly, the complementary part of the extraction system is an injection device equipped with one or more means for the introduction of water into the capsule. "Injection device" is understood to mean the part of the extraction system having the function of bringing about the opening of the capsule to supply it with water. The invention therefore proposes that this part be associated with the movable close-off means in such a way as to coordinate its movement with that of the close-off means during the closure positioning of the extraction system, in such a way as to simplify the device and reduce the loading time with respect to the prior art.

In another aspect of the invention the reception part of the extraction system comprises a movable housing for housing the capsule and movement means enabling the closing movement of the housing against the spray device in the direction of alignment of the two parts in order to permit extraction. To put it another way, the closure of the extraction system is obtained by a relative movement of translation, which is therefore less complex than the combined movements of rotation and translation of the prior art, more particularly of U.S. Pat. No. 6,240,832. Faster assembly, greater precision, less wear over time, and prolonged service life of the device are therefore obtained.

In a preferred embodiment, the movement means comprises a piston and a pressure chamber in which the pressure can be raised by a fluid to move the piston and thus the housing in the direction of the spray device and an elastic return element allowing the return to the open position of the housing by retraction of the piston. Such a system is particularly reliable in use and produces a secure pressure-resistant closure. However, other closure systems may also be envisaged such as by mechanical action of the type involving movement of the movable extraction part along a threaded rod driven by electric motor, for example, or any other equivalent means.

In accordance with another aspect of the invention, the means of unloading an individual capsule into the reception part of the extraction system moreover comprise a separation element coordinated with the movement of the close-off element in such a way as to introduce itself between the first capsule in the series positioned facing the passage and the second capsule in the series at the moment when the close-off element is moving into the opening position for the descent of the said first capsule. Such a configuration also contributes to the simplification of the device by avoiding recourse to an independently controlled element.

According to another advantageous characteristic of the invention, the close-off means comprises a means of expulsion of the capsule which expels the capsule out of the reception part of the extraction system under the action of the movement of the close-off element into the opening position in such a way as to release the reception part for the descent of a new capsule through the passage. Such a configuration arises from the same concern to avoid recourse to an element that is independently controlled by supplementary control means but takes advantage of the movement of the close-off means itself.

Turning now to the drawings, the extraction device 1 according to the invention is represented in FIG. 1 in a partial manner in order to facilitate the understanding of the principal characteristics of the invention. It comprises a storage system or carousel 10 of capsules arranged in such a way as to bring together several series of capsules housed in removable refill elements 11. The capsules are thus stacked freely in the refill elements or cartridges 11. The refill elements can take up position in a selected order, on support tubes 12 forming the base of the carousel. The support tubes are in the form of tubes of the same configuration as the refill elements so that the latter adapt themselves in alignment to feed them with capsules. The length of the support tubes 12 is a function of the buffer stock judged necessary to ensure a service in the event of removal of the removable cartridges 11 at the time of their replacement. The support tubes are hollow all the way through in such a way as to allow the capsules to pass through from the top to the bottom. The support tubes are connected between them to form a rigid assembly that can easily be moved in terms of rotation without undergoing noticeable deformation. The cartridges 11 are mounted in such a way as to orbit on a central assembly formed by hubs or wheels 13, 14 spaced vertically to which removable connection means 15 are attached which are intended to hold the cartridges. These connection means may be, as represented, clamps or any other equivalent means. The wheels 13, 14 are mounted so as to be integral in rotation on a central shaft (not represented) in such as way as to be able to drive the assembly of the carousel 10 in terms of rotation.

Figure 2:
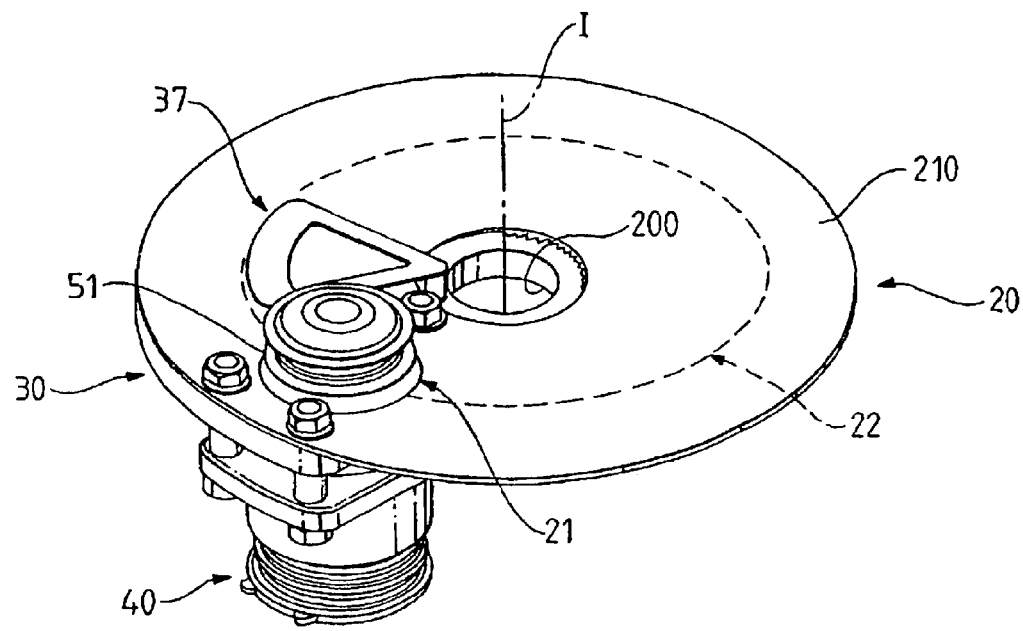
FIG. 2 is a similar perspective view of the device without the capsule storage means.

FIG. 2 shows the capsule unloading means and the extraction means which is associated therewith. Thus, the unloading means comprise a support plate 20 fixed to the frame of the device. A central hole 200 passes through the support plate 20 allowing the passage of the shaft of the storage system (not represented). The storage system 10 is therefore made movable in terms of rotation with respect to the support plate 20 which is fixed. The support plate 20 exhibits an upper surface 210 forming a means of support and retention of the capsules arranged in the support tubes 12, which are movable with sliding around the support plate 20.

According to the invention, the support plate 20 comprises a passage 21 arranged eccentrically with respect to the support plate but situated in the circular path 22, represented in dashed line, of movement of the support tubes 12. The passage 21 possesses an opening of cross section corresponding to the cross section of the opening of the support tubes. Thus, when a support tube is immobilized in alignment with the passage 21 of the support plate, the lowest capsule in the series stored in the selected support tube is brought facing the passage 21.

Underneath the support plate there is a close-off assembly 30 having the function of controlling the descent of the capsule located in the passage. The close-off assembly forms a base 31 of substantially triangular shape contiguous with respect to the support plate 20 and movable with respect to the latter in an angular manner according to two extreme positions: one corresponding to the closing-off of the passage, and the other corresponding to the opening of the passage. The base 31 is thus movable about the central axis I and controlled by gear-type means 33 (drive means not represented). The base is guided by guide means 34 of the slot type as represented in order to precisely control the movement of the base 31 between its two positions.

The base 31 comprises an opening 32 of cross section substantially equivalent to that of the passage. The opening 32 is located in such a way as to move in the path 22 of movement of the support tubes situated on the opposite side of the support plate. In the same way, the base comprises a water injection device 35 of circular shape and arranged in the path 22, likewise at a distance from the opening 32. The water injection device 35 comprises, on its surface, piercing means 36 and hot water supply means (not shown). The piercing means 36 may be spikes, blades or any other equivalent means.

Figure 3:
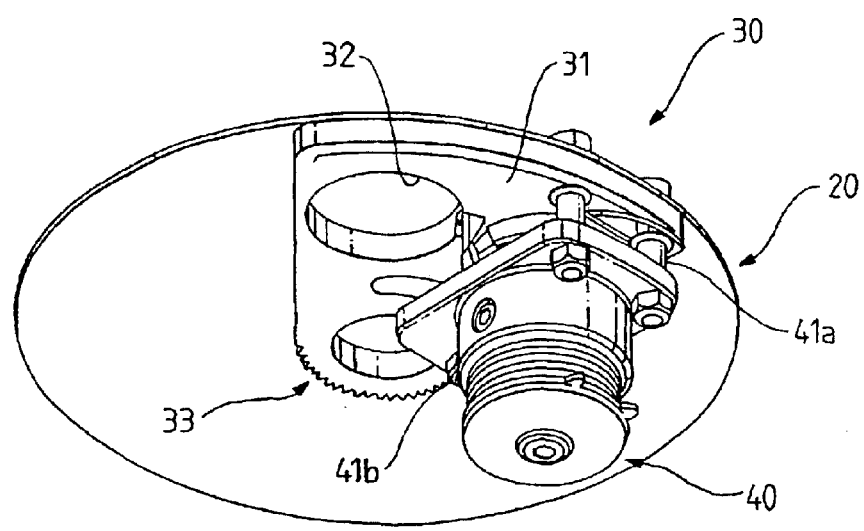
FIG. 3 is a view of the device in FIG. 2 from beneath.
Figure 4:
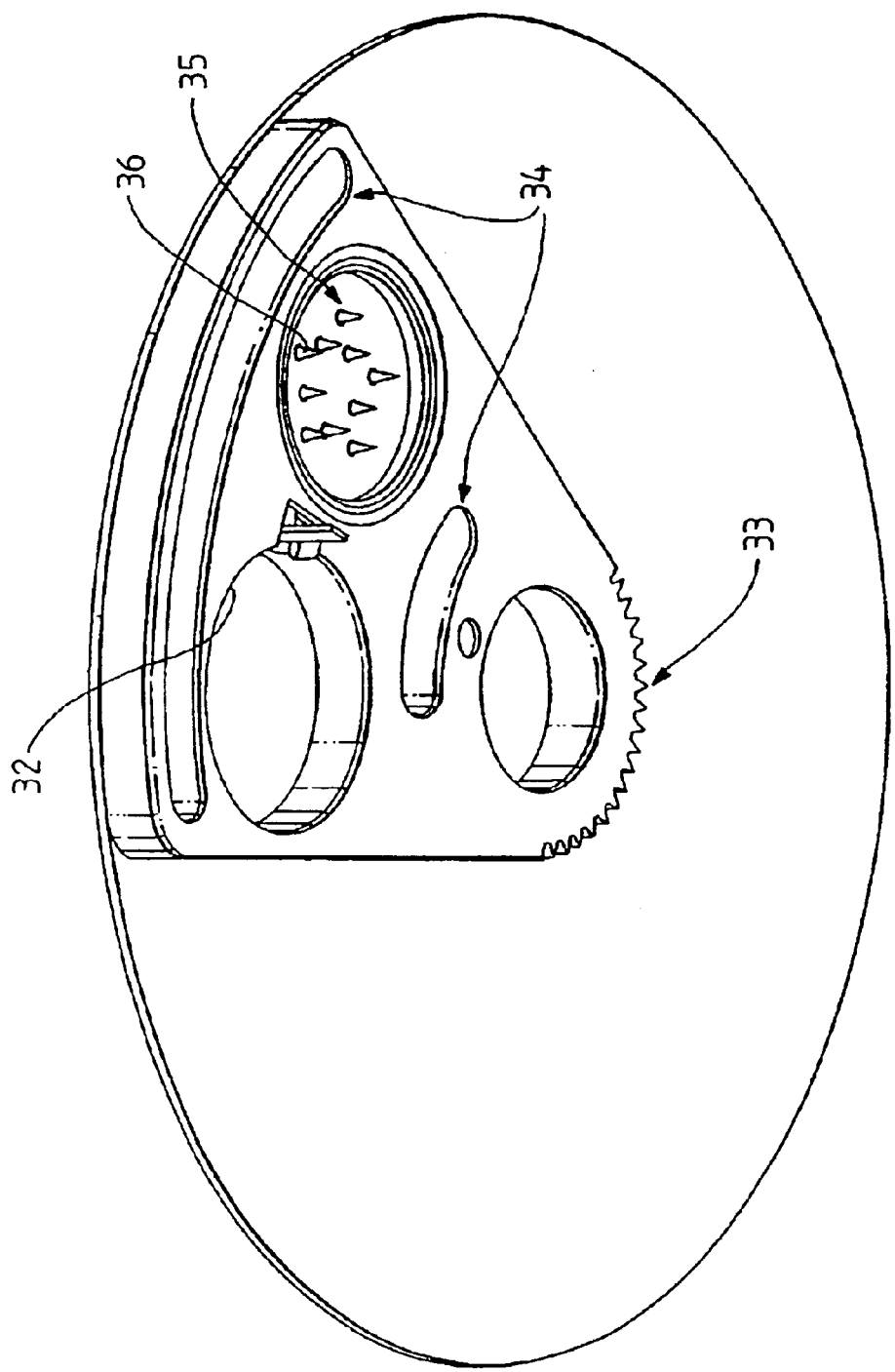
FIG. 4 is view similar to FIG. 3 but without the reception part of the extraction system.

As FIG. 3 shows, a lower extraction subassembly 40 is mounted so as to be integral on the support plate 20. The subassembly 40 forms the reception part of the capsule at the time of loading. Thus, the base 31 of the close-off system is movable with respect to this subassembly 40 along the guide means 34 by virtue of fixing rods 41a, 41b which make the subassembly 40 integral with the support plate.

Returning to FIG. 2, a separation element 37 is provided on the side of the carousel on the support plate, the function of which is to separate the capsule situated facing the passage 21 at the moment when the passage 21 is made coincident with the opening 32 of the close-off means. For this purpose, the separation element is coupled in movement with the base 31 in such a way as to move in concert on the side opposite the opening 32 of the base. The close-off element is, for example, a part in the shape of an inverted L having a separation wall substantially parallel to the support plate of a height with respect to the support plate such that the wall is able to fit between the first capsule of the selected series and the second capsule in the series at the moment when the close-off element moves into the position of opening for the descent of the first capsule.

Figure 5:
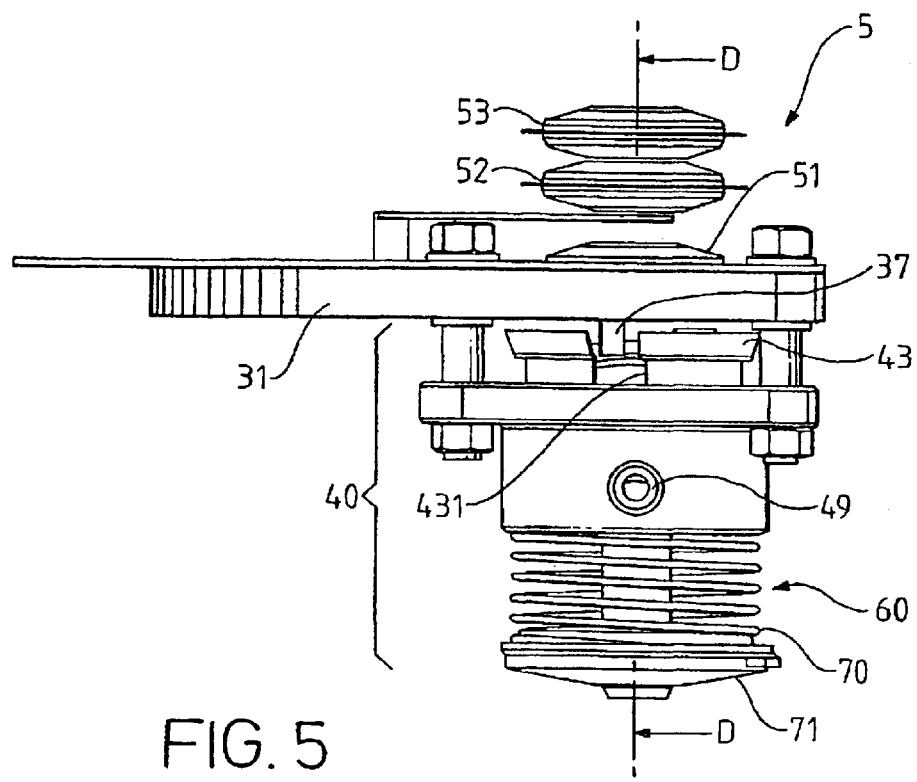
FIG. 5 is a profile view in the direction indicated by the arrow A in FIG. 3.
Figure 6:
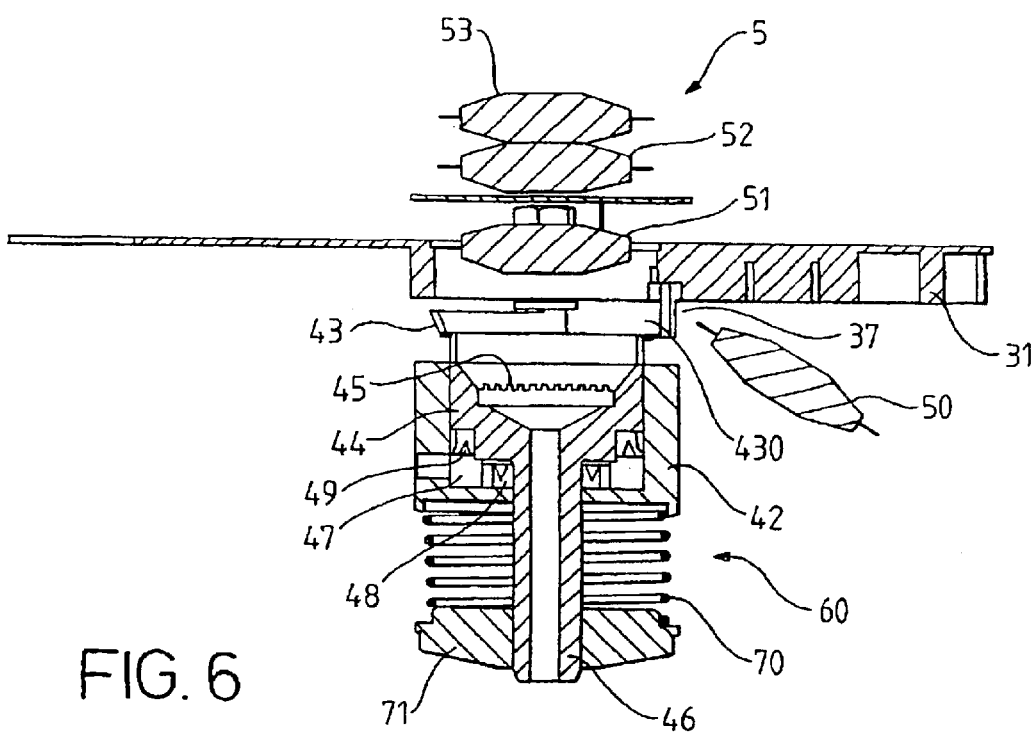
FIG. 6 is a cross-sectional view D—D in FIG. 5 at the time of the step of loading/expulsion of the capsule into/ from the device.

The reception subassembly 40 of the extraction system will now be described with reference to FIGS. 5 and 6. The capsules are identified under the common reference 5 and individually by the references 50, 51, 52, 53. The reception subassembly comprises an external container 42 which is fixed with respect to the fixing means 41a, 41b, a fixed seat 43 which continues the container and has the function of receiving the capsule in an appropriate position. The seat thus possesses edges to support the edges 53 of the capsule. On the side corresponding to the direction of movement of the base of the close-off system 31 to open the passage, the seat has a gap 430. This gap is provided for the expulsion of the capsule out of the seat after use. The expulsion is effected by an expulsion means 37 located under the base 31. On the side opposite the gap there is a slot 431 allowing the passage of the expulsion means 37 at the time of return to position of the extraction system.

Underneath the seat 43 there is a movable chamber 44 possessing a distribution plate 45 having as its function to bring about the opening of the capsule to release the liquid extract. For this purpose the distribution plate possesses sharpened reliefs capable of perforating the capsule under the action of a sufficient pressure of water in the capsule. The chamber 44 is movable in terms of translation in the bore of the container 42.

The chamber is continued downwards by a pouring channel 46 allowing the extraction liquid to escape under gravity directly into the receptacle (not represented). Movement means 60 are provided to control the movement of the chamber in the container. These means comprise a piston assembly formed by the chamber 44 itself, the container 42, the pouring channel 46, an internal pressurization chamber 47, seals 48, 49 for sealing the chamber 47, and a pressure fluid inlet 49. These means are associated with elastic return means, comprising a return spring 70, located between the container 42 and a bearing surface 71 allowing the return of the chamber 44 into the position of opening.

The principle of operation of the device according to the invention will now be described in greater detail in relation to the figures.

In a first stage, after the user has chosen the capsule in the desired series or cartridge, the carousel 10 is driven in terms of rotation either manually or by an electric motor situated underneath the device. The carousel is immobilized when the tube carrier containing the desired capsule coincides with the passage 21 of the support plate 20. The selection of the capsule can be carried out in accordance with various automatic modes. For example, the cartridges 11 can bear an identification means such as a bar code which is readable by a reader situated in the device. The bar code gives indications regarding the type of capsule contained in the cartridge. These indications are read by the reader and processed by a control system which controls the carousel motor. Thus, the relative position of the cartridge has no influence on the choice and selection of the capsule.

Following selection of the desired cartridge, the device is located in the position illustrated in FIG. 2, with a capsule 51 in position in the passage 21. The passage is closed off by the close-off means 30, the base 31 of which is in the position of closure, that is to say with the spray device 35 above the reception part 40 of the extraction system. The descent of the capsule 51 is then controlled by movement in terms of rotation of the close-off means 30 in such a way as to cause the passage 21 of the support plate to coincide with the opening 32 of the close-off base 31 as shown in FIG. 6. At the same time, the capsule 50 extracted during the preceding extraction cycle is expelled by the expulsion means 37 through the gap 430. The expulsion means may be a blade or push element capable of pushing the capsule 50 out of the seat and, on the contrary, flexible in the opposite direction in order to be able to bend on contact with the new capsule engaged in the seat. The blade is positioned with respect to the opening 32 in such a way as to expel the used capsule 50 before the descent of the new capsule 51. As the new capsule 51 descends into the seat 43, the separation means 37 moves in concert with the base 31 of the close-off means in order to insert itself between the descending capsule 51 and the second capsule 52 in the series. The latter can thus be retained in place in the tube carrier.

Figure 7:
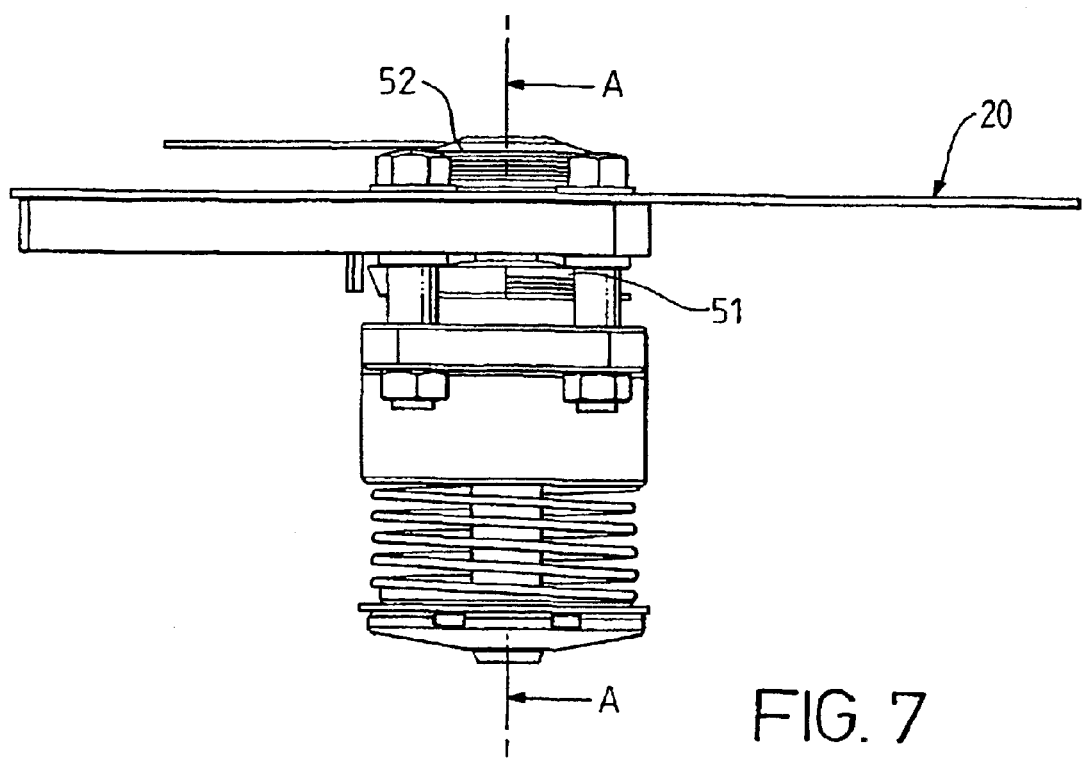
FIG. 7 is a profile view in the direction indicated by the arrow B in FIG. 3.
Figure 8:
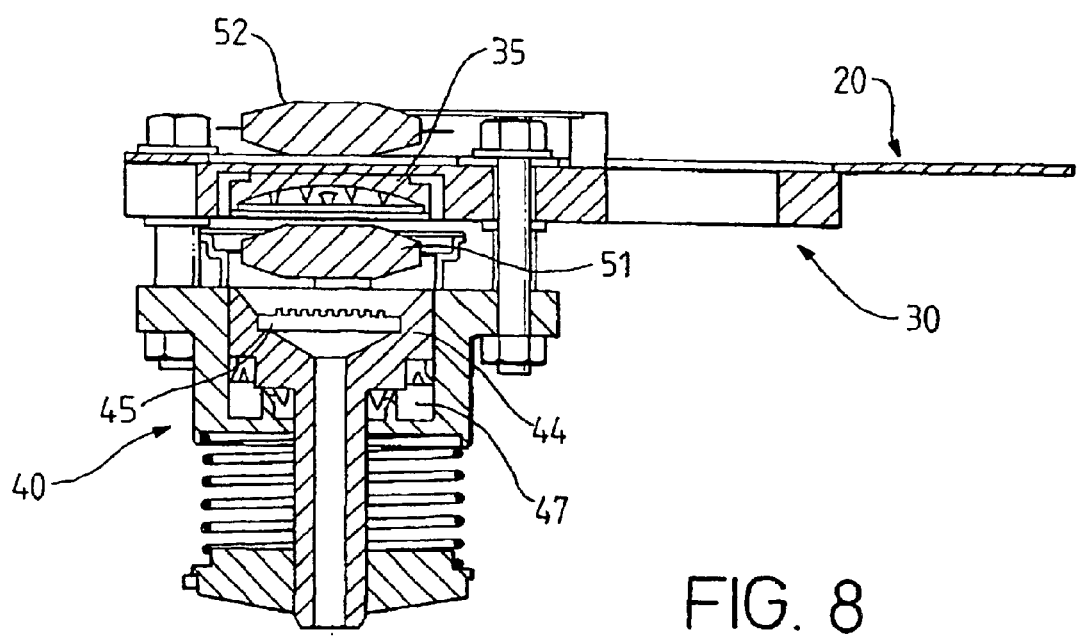
FIG. 8 is a cross-sectional view along A—A in FIG. 7 with the extraction system containing a capsule to be extracted in position before the locking of the extraction system.
Figure 9:
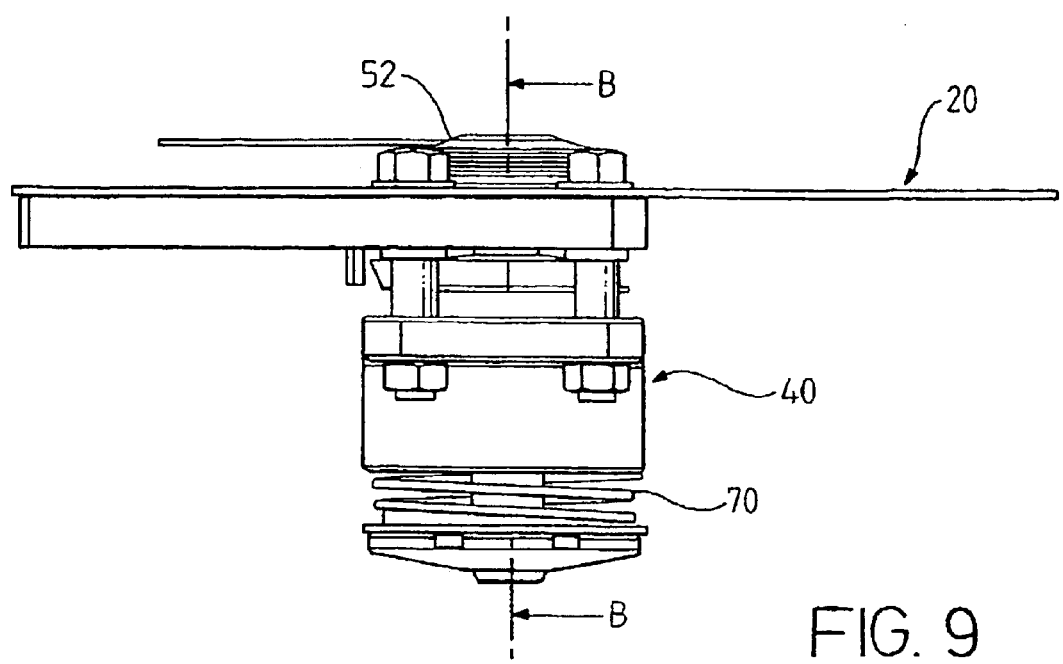
FIG. 9 is a profile view in the direction indicated by the arrow B in FIG. 3 but with the system in the locking position (compressed return spring)

Following descent of the new capsule and expulsion of the used capsule, the close-off means 30 is controlled for a return to position such as represented in FIGS. 7 and 8. The cycle of descent-expulsion then return to position can be very rapid, of the order of 0.5 seconds to 1.5 seconds approximately. In the position of loading illustrated, the water injection device 35 provided in the base is positioned in alignment with the reception part 40 of the extraction system. The return to position also has the effect of causing the capsule 52 to descend on contact with the support plate 20 due to the retraction of the separation means.

Figure 10:
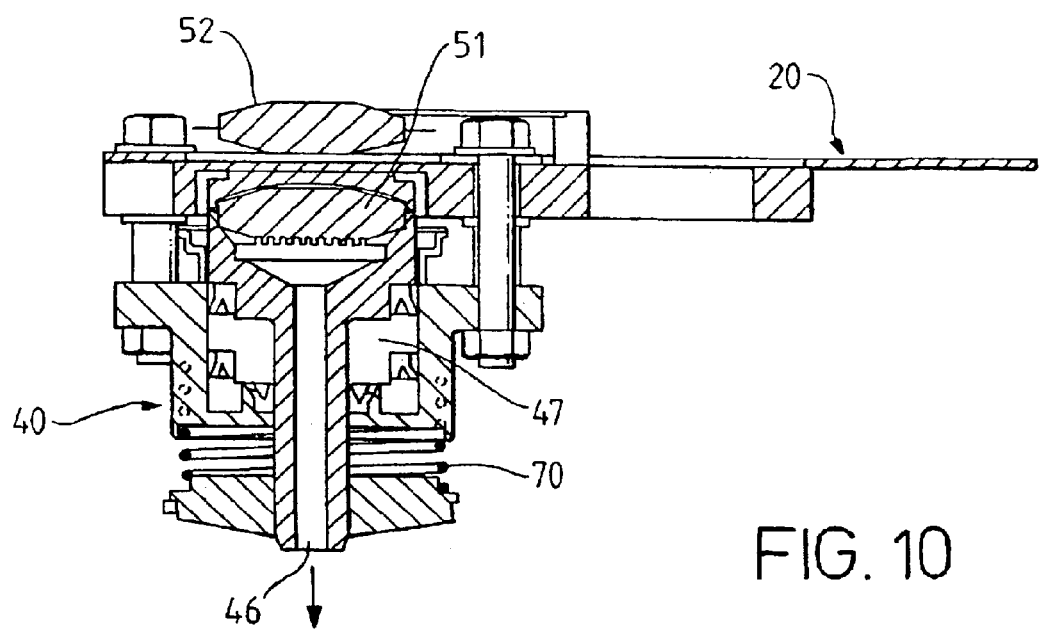
FIG. 10 is a cross-sectional view along B—B in FIG. 9.

The next step consists in reclosing the extraction system over the capsule to be extracted 51. For this purpose the pressure chamber 47 is pressurized by injecting fluids through the opening 49, which moves the movable chamber 44 upwards to establish sufficient leak tightness of the cavity formed with the lower assembly and the spray device 35. The capsule may possess edges which are pinched at the time of closure in such a way as to maintain the capsule in the correct position at the time of closure. Once the extraction system is closed, the capsule is pierced by the spikes of the water injection device under the action of the compression at the time of closure. Water at sufficient temperature to cause extraction can then be introduced into the capsule through the injection device 35. The pressure inside the capsule rises with the volume of water introduced until the lower face of the capsule ruptures on contact with the relief elements of the distribution plate 45. As FIG. 10 shows, the extracted liquid can then leave the capsule and pour out under gravity through the pouring channel 46. A receptacle such as a cup is placed under the channel 46 in such a way as to receive the liquid. A new cycle of loading-expulsion can then commence.

The invention has been described by way of preferred example in relation to a preferred embodiment. However, it is understood that the invention can include numerous variants or equivalents within the scope of those skilled in the art.

What is claimed is:

1. A device for feeding capsules containing a substance to be extracted to form a drink, comprising:

storage means that includes a plurality of capsules arranged in several series;

means for individually unloading a capsule selected from one of the series of capsules into a drink-forming position and comprising support means on which the storage means is rotatable and comprising a passage;

means for forming a drink from a liquid extract of the substance by the introduction of a liquid under pressure into the selected capsule; and a reception part arranged beneath the individual unloading means to receive the selected capsule by direct descent through the passage and from the storage means, the reception part including means for opening the capsule to release the drink.

2. The device of claim 1 wherein each series of capsules contains like capsules that are capable of making of a beverage that is different from that made from the other series of capsules.

3. The device of claim 1 wherein the storage means includes a plurality of capsule holding tubes each of which contains one series of capsules.

4. The device of claim 3, wherein the capsule holding tubes are mounted vertically on a rotatable support so that selection of a series of capsules is made by rotation of the support to position a selected series of capsules above the reception part.

5. The device of claim 4, wherein the unloading means comprises a stationery plate having the passage in alignment with the selected capsule holding tube and arranged to allow a capsule to descend into the reception part; and close-off means able to move with respect to the passage between a closed position in which the passage is closed off by the close-off means in such a way as to allow the capsule to face the passage but remain in the storage means and an open position in which the passage is opened to allow the capsule to descend into the reception part.

6. The device of claim 5, wherein the close-off means comprises a movable plate having an aperture that conforms to the passage and that is movable from the closed position, where movement of the capsule through the passage is prevented by the movable plate, to the open position where the aperture of the moveable plate is aligned with the passage of the stationery plate so as to allow the capsule to move through the passage and into the reception part.

7. The device of claim 1, wherein the drink forming means comprises a device for injecting water into the capsule.

8. The device of claim 7, wherein the reception part of the extraction system comprises a movable housing for housing the capsule and movement means enabling the closing movement of the housing against the injection device in the direction of alignment of the two parts in order to permit the introduction of water into the capsule.

9. The device of claim 8, wherein the movement means comprise a piston, a pressure chamber in which the pressure can be raised to move the piston and thus the housing in the direction of the injection device and an elastic return element allowing the return to the open position of the housing by retraction of the piston.

10. The device of claim 5, wherein the movable close-off means is mounted coaxially with respect to the support means in such a way as to be movable along a portion of an arc between the two positions.

11. The device of claim 5, wherein the means of for unloading an individual capsule into the reception part of the extraction system comprise a separation element coordinated with the movement of the close-off element in such a way as to introduce itself between the first capsule in the series positioned facing the passage and the second capsule in the series at the moment when the close-off element is moving into the opening position for the descent of the first capsule.

12. The device of claim 5, wherein the close-off means comprises means for expulsion of a spent capsule out of the reception part of the extraction system under the action of the movement of the close-off element into the opening position into such a way as to release the reception part for the descent of a new capsule through the passage.

13. The device of claim 1, wherein the opening means of the reception part is a pressure distribution plate provided with reliefs for opening the capsule and openings for the passage of the liquid extract.

14. The device of claim 13, further comprising means for conveying the drink for dispensing.

15. The device of claim 14, wherein the conveying means of the reception part of the system comprises a dispensing channel situated beneath the pressure distribution plate.

16. A device for feeding capsules containing a substance to be extracted to form a drink, the device comprising:
- a storage that includes a plurality of capsules arranged in several series;
- a capsule unloader for individually unloading a capsule selected from one of the series of capsules into a drink-forming position and comprising a support having a passage therein, wherein the storage system is rotatable on the support;
- a water injection device for forming a drink from a liquid extract of the substance by the introduction of a liquid under pressure into a selected capsule; and
- a reception to receive the selected capsule by direct descent through the passage and from the storage, the reception including a distribution plate for opening the selected capsule to release the drink.

* * * * *